US010901607B2

(12) United States Patent
Banguero et al.

(10) Patent No.: US 10,901,607 B2
(45) Date of Patent: Jan. 26, 2021

(54) CAROUSELING BETWEEN DOCUMENTS AND PICTURES

(71) Applicant: Microsoft Technology Licensing, LLC, Redmond, WA (US)

(72) Inventors: Edgar A. Banguero, Seattle, WA (US); Can M. Comertoglu, Seattle, WA (US); Kirk R. Myhre, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 123 days.

(21) Appl. No.: 15/349,267

(22) Filed: Nov. 11, 2016

(65) Prior Publication Data

US 2017/0371533 A1 Dec. 28, 2017

Related U.S. Application Data

(60) Provisional application No. 62/354,365, filed on Jun. 24, 2016.

(51) Int. Cl.
| | | |
|---|---|---|
| *G06F 3/048* | (2013.01) | |
| *G06F 3/0488* | (2013.01) | |
| *G06F 3/0485* | (2013.01) | |
| *G06F 3/0481* | (2013.01) | |
| *G06F 3/0483* | (2013.01) | |
| *G06F 3/0482* | (2013.01) | |

(Continued)

(52) U.S. Cl.
CPC ........ *G06F 3/04883* (2013.01); *G06F 3/0482* (2013.01); *G06F 3/0483* (2013.01); *G06F 3/0485* (2013.01); *G06F 3/04817* (2013.01); *G06F 16/168* (2019.01); *G06F 40/106* (2020.01); *G06F 2203/04806* (2013.01)

(58) Field of Classification Search
None
See application file for complete search history.

(56) References Cited

U.S. PATENT DOCUMENTS

| | | |
|---|---|---|
| 7,689,933 B1 | 3/2010 | Parsons |
| 8,032,482 B2 | 10/2011 | Rosenberg et al. |
| 2005/0246643 A1 | 11/2005 | Gusmorino et al. |

(Continued)

FOREIGN PATENT DOCUMENTS

| | | |
|---|---|---|
| CN | 102662983 A | 9/2012 |
| CN | 103955401 A | 7/2014 |
| CN | 104090862 A | 10/2014 |

OTHER PUBLICATIONS

"International Search Report and Written Opinion Issued in PCT Application No. PCT/US2017/038408", dated Oct. 17, 2017, 15 Pages.

(Continued)

*Primary Examiner* — William C Trapanese
(74) *Attorney, Agent, or Firm* — Christopher J. Volkmann; Kelly, Holt & Christenson, PLLC

(57) ABSTRACT

A file folder includes files of various different media types. A user's input is detected and a representation of the different files in the folder is displayed in a horizontally scrollable display that can be moved based on the user's input. A user interaction is detected and a file is then displayed in an interactive mode in which interactive, contextual controls are surfaced for user interaction, in order to interact with the displayed file.

18 Claims, 17 Drawing Sheets

(51) Int. Cl.
    *G06F 16/16*           (2019.01)
    *G06F 40/106*         (2020.01)

(56) References Cited

U.S. PATENT DOCUMENTS

| | | |
|---|---|---|
| 2006/0106822 A1 | 5/2006 | Lee et al. |
| 2009/0106674 A1* | 4/2009 | Bray .................... G06F 3/0481 715/762 |
| 2010/0175026 A1* | 7/2010 | Bortner ................ G06F 3/0481 715/818 |
| 2011/0246571 A1 | 10/2011 | Klier et al. |
| 2012/0081375 A1 | 4/2012 | Robert et al. |
| 2013/0047079 A1 | 2/2013 | Kroeger et al. |
| 2013/0111326 A1 | 5/2013 | Lockhart et al. |
| 2013/0191730 A1 | 7/2013 | Carlen et al. |
| 2014/0059497 A1* | 2/2014 | Burckart ............... G06F 3/0482 715/854 |
| 2014/0137020 A1* | 5/2014 | Sharma ................ G06F 3/0482 715/769 |
| 2014/0237357 A1 | 8/2014 | Meyer et al. |
| 2015/0186397 A1 | 7/2015 | Cueto et al. |

OTHER PUBLICATIONS

"Preview (El Capitan): View PDFs and images", Retrieved on: Jun. 23, 2016 Available at: https://support.apple.com/kb/PH22428?locale=en_US&viewlocale=en_US.

LK, "Enable & View Content Previews in Windows Explorer with Preview Pane", Published on: May 11, 2015 Available at: https://techjourney.net/enable-view-content-previews-in-windows-explorer-with-preview-pane/.

\* cited by examiner

CAROUSELING BETWEEN DOCUMENTS AND PICTURES

BACKGROUND

Computing systems are currently in wide use. Some computing systems allow users to store content of various different media types, such as photos, PDFs, text documents, among others, in a data store.

Some computing systems also allow users to view portions of the stored content in a carousel mode. In the carousel mode, a user is able to view content in a folder that has photos. A carousel component generates an overlay of the photos, over the display of the file content. When a user uses a swipe gesture (such as swiping on a touch sensitive screen or using a mouse or other point and click device), the user can switch to view a different photo. The carouseling component (or object) generates a visual panning display that visually pans the photos in a horizontal, but continuous direction based on the user's swipe gesture. That is, the visual panning display goes around as if the photos are on a carousel.

The discussion above is merely provided for general background information and is not intended to be used as an aid in determining the scope of the claimed subject matter.

SUMMARY

A file folder includes content of various different media types. A user's swipe gesture is detected and a representation of the different files in the folder is displayed in a horizontally scrollable display that can be moved based on the user's swipe gesture. A user interaction is detected and a file is then displayed in an interactive mode in which interactive controls are surfaced for user interaction, in order to interact with the displayed file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
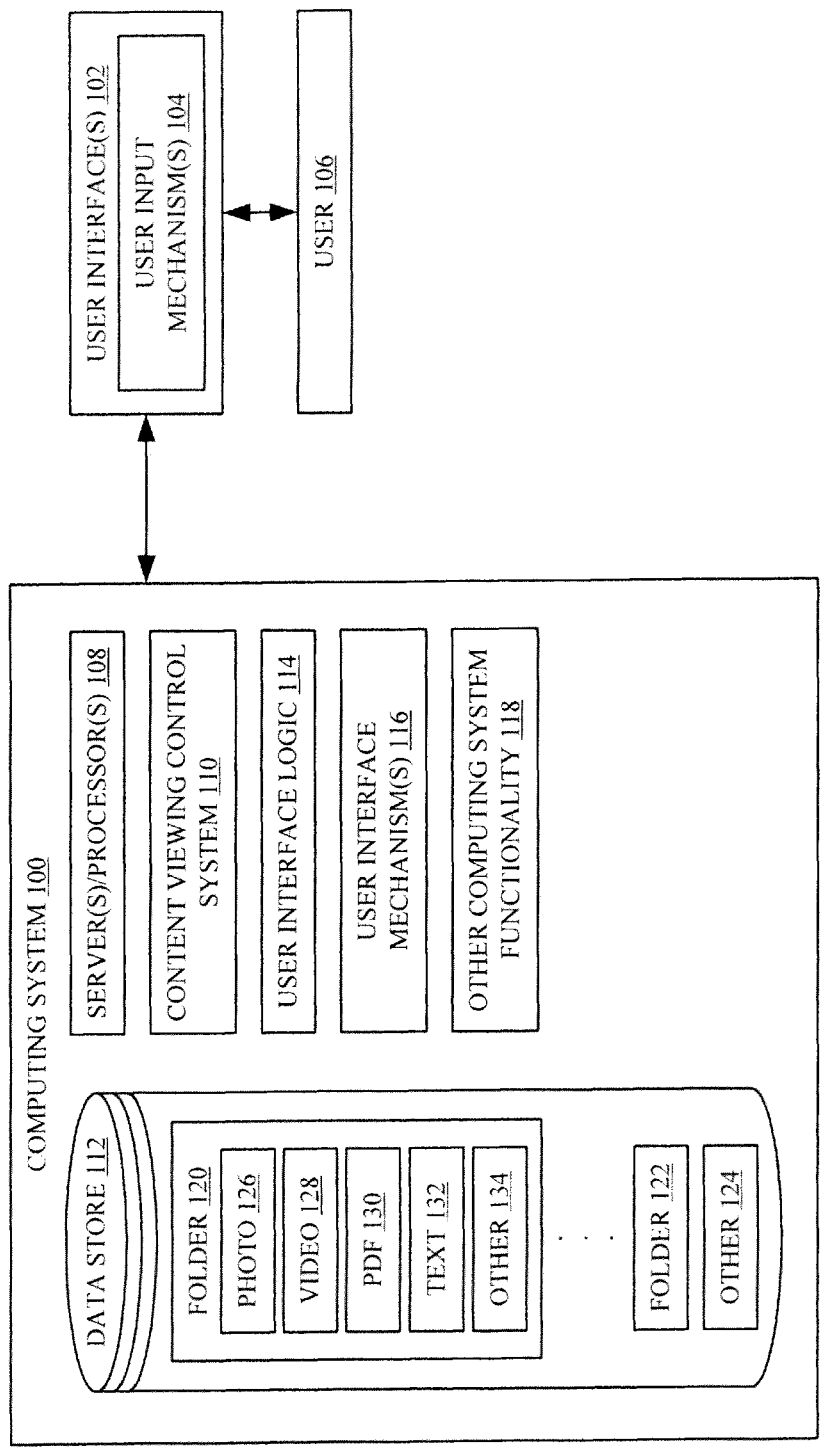
FIG. 1 is a block diagram of one example of a computing system.

FIG. 1 shows one example of a computing system 100 that generates user interfaces 102 with user input mechanisms 104 for interaction by user 106. User 106 illustratively interacts with user input mechanisms 104 in order to control and manipulate computing system 100.

Computing system 100, itself, can include servers or processors 108, content viewing control system 110, data store 112, user interface logic 114, user interface mechanisms 116 and it can include a wide variety of other computing system functionality 118. Data store 112, itself, can store a plurality of different folders 120-122 and a wide variety of other items 124. Each folder 120 can store files of different media types. For instance, folder 120 is shown storing photo 126, video file 128, PDF file 130, text file 132, and it can include a wide variety of files of other media types 134.

Content viewing control system 110 is described in greater detail below with respect to FIG. 2. Briefly, it allows the user to view the contents of a folder 120-122 in a carousel mode. In that mode, a carousel object (or other mechanism) can be used to generate, for each of the files 126-134 in a folder 120, a visual representation (such as a preview representation) and those visual representations can be displayed in a continuous horizontally (or orientated otherwise) pannable display. The representations, as they are panned, revolve into and out of view, as if on a turning carousel.

User interface logic 114 detects a panning user input through a user interface mechanism 116 (or a user input mechanism 104) indicating that the user wishes to scroll the carousel display (or horizontally and continuously pannable display). Based on that input, content viewing control system 110 horizontally scrolls the representations of the different files 126-134 in the folder 120 being viewed. User interface logic 114 detects the user inputs and provides an indication of the input to the appropriate item in computing system 100.

The user interface mechanisms 116 can include a wide variety of different user interface mechanisms. Some of them are described in greater detail below. Briefly, however, they can include a mouse or trackball or other point and click device, a microphone where computing system 100 includes speech recognition components, a touch sensitive screen so that the user can provide inputs using touch gestures, or a wide variety of other user interface mechanisms.

Content viewing control system 110 also illustratively detects a user input indicating that the user wishes to enter an interactive mode with one of the files displayed in the carousel (or horizontally scrollable) display. In that case, it surfaces interactive controls, based upon the particular media type of the file that the user wishes to interact with, for user interaction. The user can then interact with the file of the specified media type, using the appropriate controls. Examples of these are also described in greater detail below.

Figure 2:
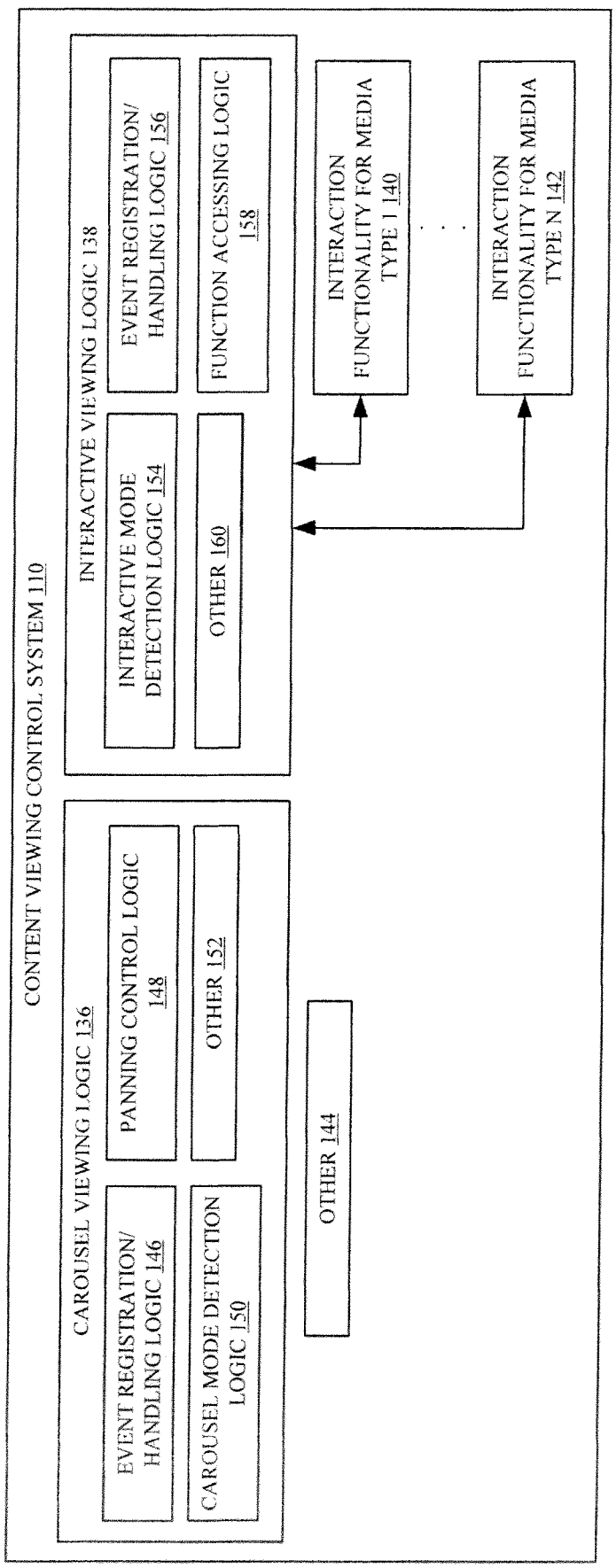
FIG. 2 is a block diagram showing one example of a content viewing control system in more detail.

FIG. 2 is a block diagram showing one example of content viewing control system 110, in more detail. System 110 illustratively includes carousel viewing logic 136, interactive viewing logic 138, a plurality of different sets of interaction functionality for different media types (and represented by numbers 140-142 in FIG. 2), and it can include a wide variety of other items 144.

Carousel viewing logic 136 illustratively generates the carousel view (or horizontally scrollable view) of the contents of a folder (such as the contents 126-134 of folder 120), and interactive viewing logic 138 illustratively handles the user interactions when the user enters an interactive mode with a particular file. In doing so, it accesses one of the sets of interaction functionality 140-142 for the particular media type being displayed and surfaces appropriate user input mechanisms to accomplish the interaction functionality for that media type. For example, if the media type of the file that the user wishes to interact with is a PDF file, then the interactive viewing logic 138 surfaces a set of interaction functionality (for instance functionality 140) that allows the user to interact with the PDF file to perform actions on the PDF file, such as scrolling through pages of the PDF file, searching for text in the PDF file, resizing the content in the PDF file, etc. Where the media type is a photo, then the interaction functionality for the photo is surfaced so that the user can interact with the photo. For instance, user input mechanisms may be surfaced that allow the user to zoom or move around the photo. In one example, the user input mechanisms allow the user to enlarge the photo, rotate or crop the photo, etc.

Carousel viewing logic 136, itself, illustratively includes event registration/handling logic 146, panning control logic 148, carousel mode detection logic 150 and it can include a wide variety of other items 152. Event registration/handling logic 146 illustratively registers for all user input events relevant to carousel viewing when the user enters the carousel viewing mode. Panning control logic 148 detects user inputs (based upon captured events) indicating that the user is providing a panning input and horizontally scrolls the display based on the captured input. Carousel mode detection logic 150 detects when the user wishes to enter the carousel mode of viewing the content of a file, either initially when a folder is being viewed, or when the user wishes to return to the carousel mode, from the interactive viewing mode.

Interactive viewing logic 138, itself, illustratively includes interactive mode detection logic 154, event registration/handling logic 156, functionality accessing logic 158, and it can include a wide variety of other items 160. Interactive mode detection logic 154 detects a user input indicating that the user wishes to enter the interactive mode with respect to a file being displayed in the carousel mode. Event registration/handling logic 156 registers for the various user input events indicative of the user providing interactive inputs to interact with the file, and communicates to event registration/handling logic 146 that it is taking over handling of these events. Functionality accessing logic 158 identifies the media type of the file being interacted with and accesses the various types of interaction functionality 140-142, for that particular media type, so that the appropriate user input mechanisms can be surfaced to allow the user to interact with the file, of that particular media type.

Figure 3:
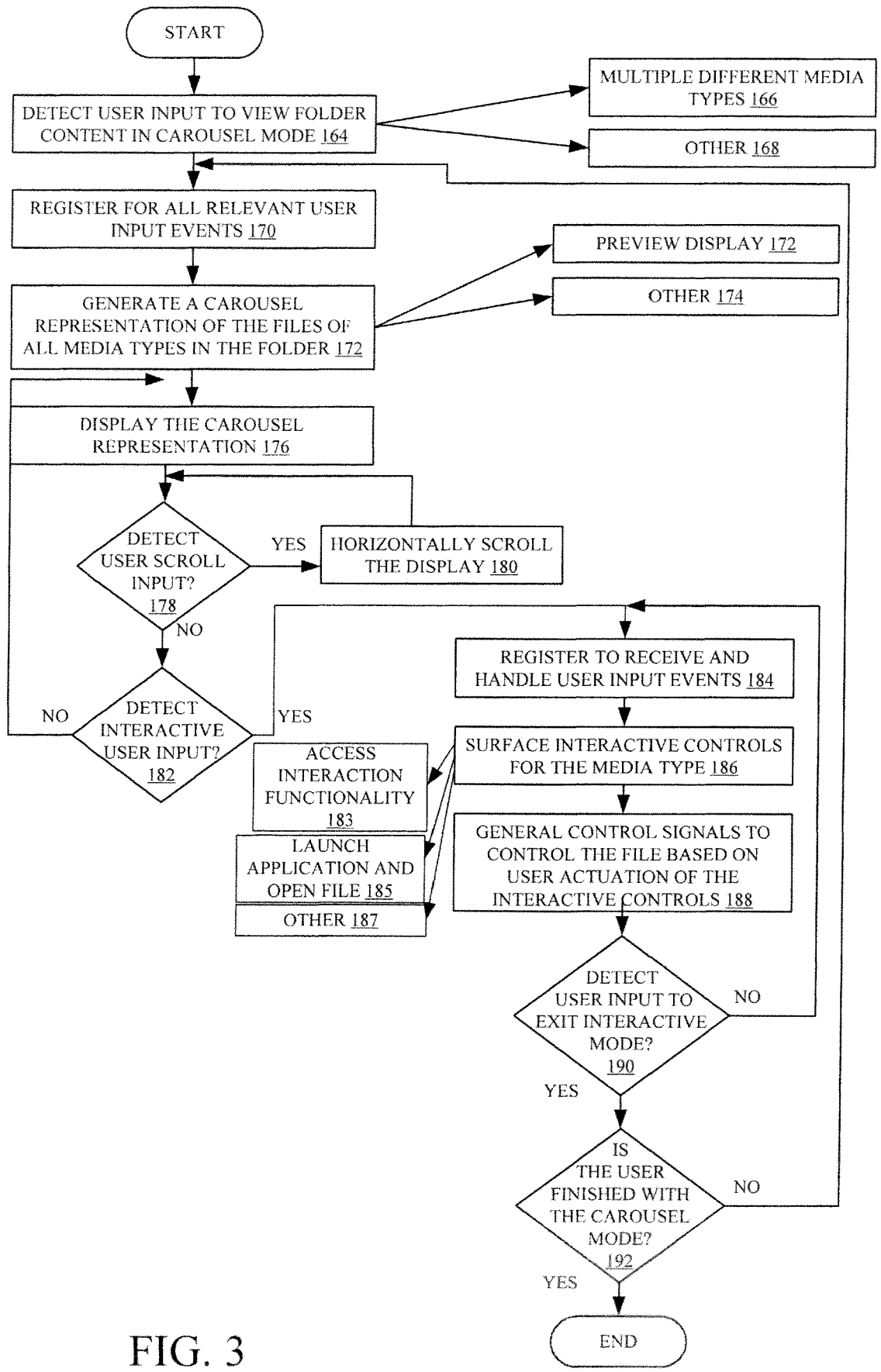
FIG. 3 is a flow diagram illustrating one example of the operation of the content viewing control system in allowing a user to view content.

FIG. 3 is a flow diagram illustrating one example of the operation of computing system 100 (and content viewing control system 110) in allowing a user to view files of different media types in a carousel viewing mode, and also to switch to an interactive mode to interact with the content, and then switch back to the carousel viewing mode. Thus, carousel mode detection logic 150 first detects a user input indicating that the user wishes to view the contents of a folder (such as folder 120) in carousel viewing mode. This is indicated by block 164 in the flow diagram of FIG. 3. For instance, carousel viewing logic 136 may display a user input mechanism that can be actuated, or detect another input, by the user to enter the carousel viewing mode. The carousel viewing mode may be used to view representations of different files in folder 120, even though those files are of multiple different media types. This is indicated by block 166. The carousel viewing mode can be detected in other ways as well, and this is indicated by block 168.

Event registration/handling logic 146 then registers in computing system 100 to receive all user input events (detected, for instance, by user interface logic 114) indicative of the user controlling viewing of the content in the carousel mode. This is indicated by block 170.

Panning control logic 148 then generates a carousel representation of all of the files 126-134 in the folder 120 being viewed in the carousel mode. This is indicated by block 172 in the flow diagram of FIG. 3. In one example, the carousel representations are preview displays 172 (such as thumbnail representations of each file 126-134 or other representations that visually display a portion of the file but are not interactive). However, they can be other types of representations as well, and this is indicated by block 174.

Panning control logic 148 then displays the carousel representations in a horizontally scrollable display (or carousel display). This is indicated by block 176. The user can then use a swipe gesture with a point and click device, with a touch gesture, or with another user input mechanism, in order to horizontally scroll through the various carousel representations of the files 126-134 in the folder 120 being viewed. It will be noted that the user can view carousel representations of all of the different media types in the carousel mode. Detecting a user scroll input is indicated by block 178, and horizontally scrolling the display based upon the detected user input is indicated by block 180.

At some point, it may be that interactive mode detection logic 154 detects an interactive user input indicating that the user wishes to interact with a particular file being displayed in the carousel mode. Detecting the interactive user input is indicated by block 182 in FIG. 3. This can be done in a wide variety of different ways. For instance, where a carousel representation of a file is being displayed, the user may click on, or tap on, that representation and this will be detected by interactive mode detection logic 154 as a user input indicating the user wishes to interact with the underlying file. Other user input mechanisms can be provided for actuation to indicate this, and interactive mode detection logic 154 can detect this in other ways as well. In another example, the interactive mode can be entered automatically without a user input, and based on some other automatically detected criterion.

When the interactive user input is detected, event registration/handling logic 156 registers to receive and handle the user input events that were previously being handled by event registration/handling logic 146, when in the carousel viewing mode. Having event registration/handling logic 156 in the interactive viewing logic 138 register to receive those events is indicated by block 184.

Functionality accessing logic 158 then accesses the interaction functionality 140-144 for the appropriate media type of the file that the user wishes to interact with, and surfaces interactive controls for that media type. This is indicated by block 186. It can do this by accessing separate components that provide the interactive controls, as indicated by block 183. It can launch an application with that functionality and then open the file with the launched application. This is indicated by block 185. It can also surface the interactive controls natively, or in other ways, as indicated by block 187.

It then generates control signals to control the file based on user actuation of the interactive controls. This is indicated by block 188. For instance, if the file being interacted with is a PDF media type, then PDF interactive user input mechanisms can be surfaced and actuated by the user to perform interactive operations on the PDF file. Where the file being interacted with is a photo, then user input mechanisms can be surfaced that allow the user to interact with the photo. These are examples only and the same can be done with files of other media types.

This continues until carousel mode detection logic 150 detects a user input indicating that the user wishes to exit the interactive mode. This is indicated by block 190 in the flow diagram of FIG. 3. It also detects whether the user has provided an input indicating the he or she is finished with the carousel mode as well. This is indicated by block 192. If so, processing is finished. However, if not, then processing reverts to block 170 where event registration/handling logic 146 again registers to receive all of the user input events relevant to the carousel viewing mode, and processing continues from block 170, as described above, where the carousel representations are displayed in the horizontally pannable display.

Figure 4:
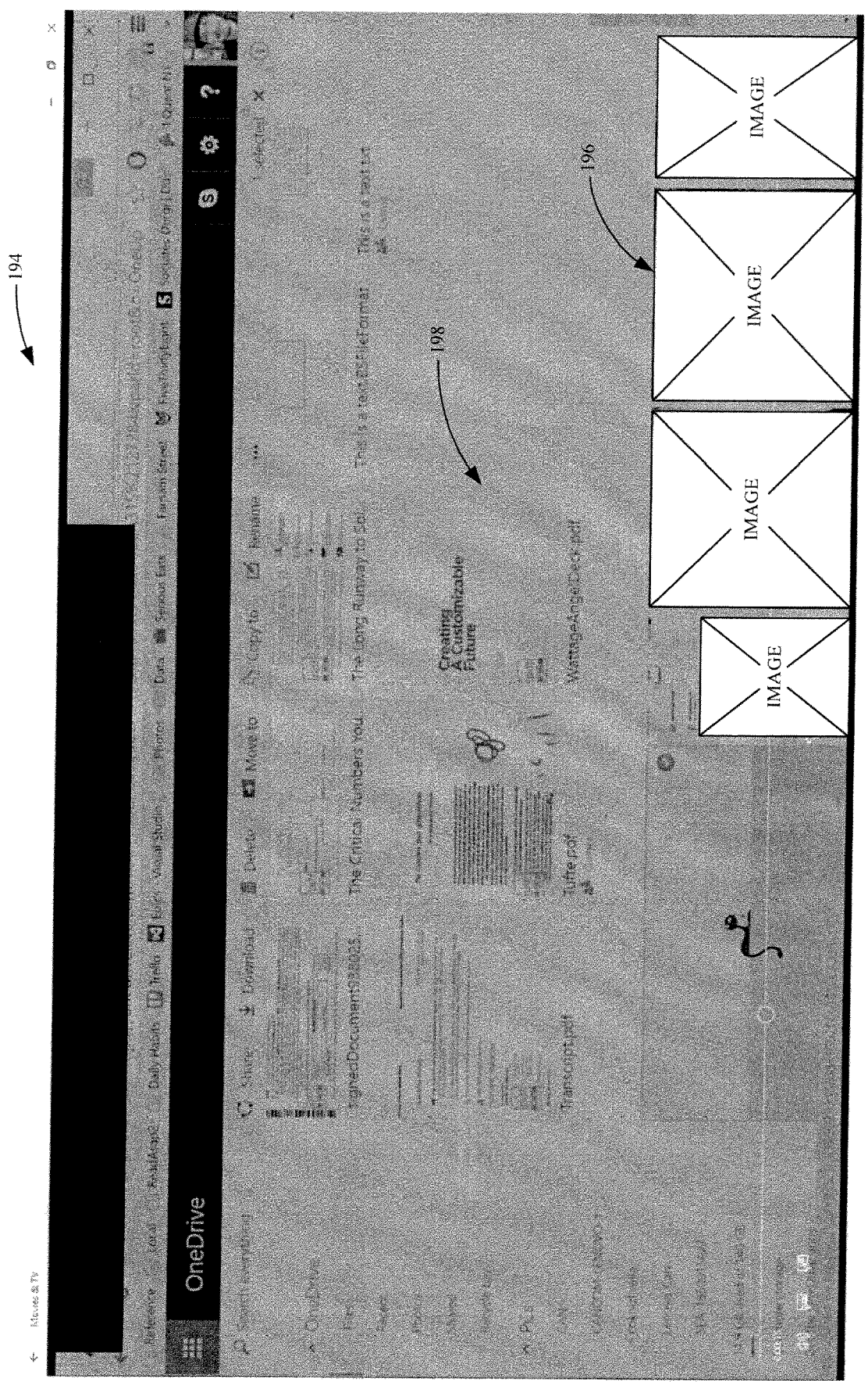
FIGS. 4-12 show various examples of a user interface display that can be generated by the content viewing control system.

FIGS. 4-12 show a plurality of user interface displays that indicate one example of the operation of content viewing control system 110 in more detail. FIG. 4 shows a user interface display 194 which illustrates that the user is viewing the contents of a particular folder in a data store 112. The content includes a plurality of photos shown generally at 196, a set of PDF files shown generally at 198, and a number of other files.

Figure 5:
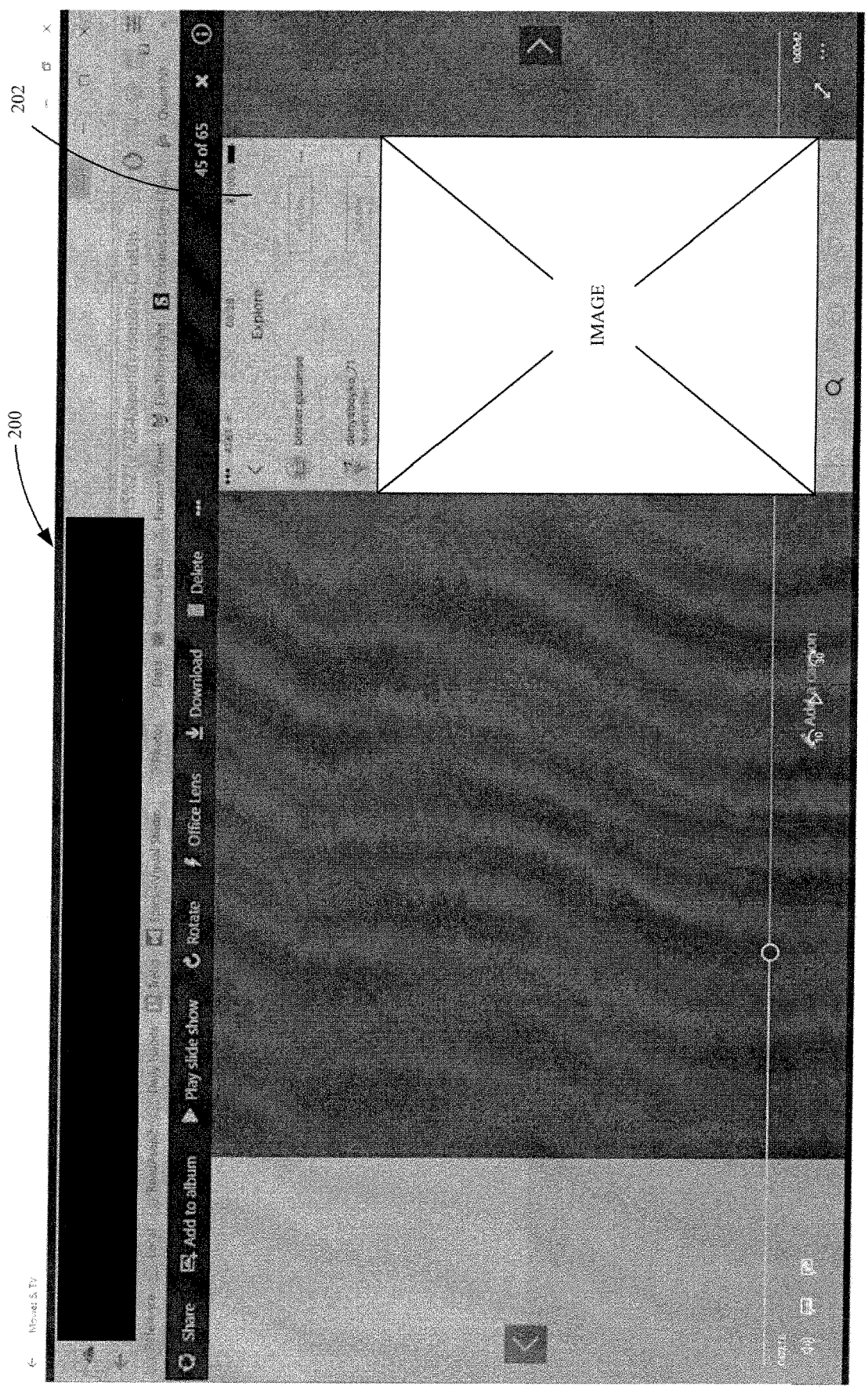

FIG. 5 shows an example in which the user has actuated a user input mechanism to enter the carousel viewing mode. It can be seen that a carousel representation 202 has been generated for a photo (and for the other files in the folder shown in FIG. 4) and the user can now scroll the display horizontally to view different carousel representations of the files.

Figure 6:
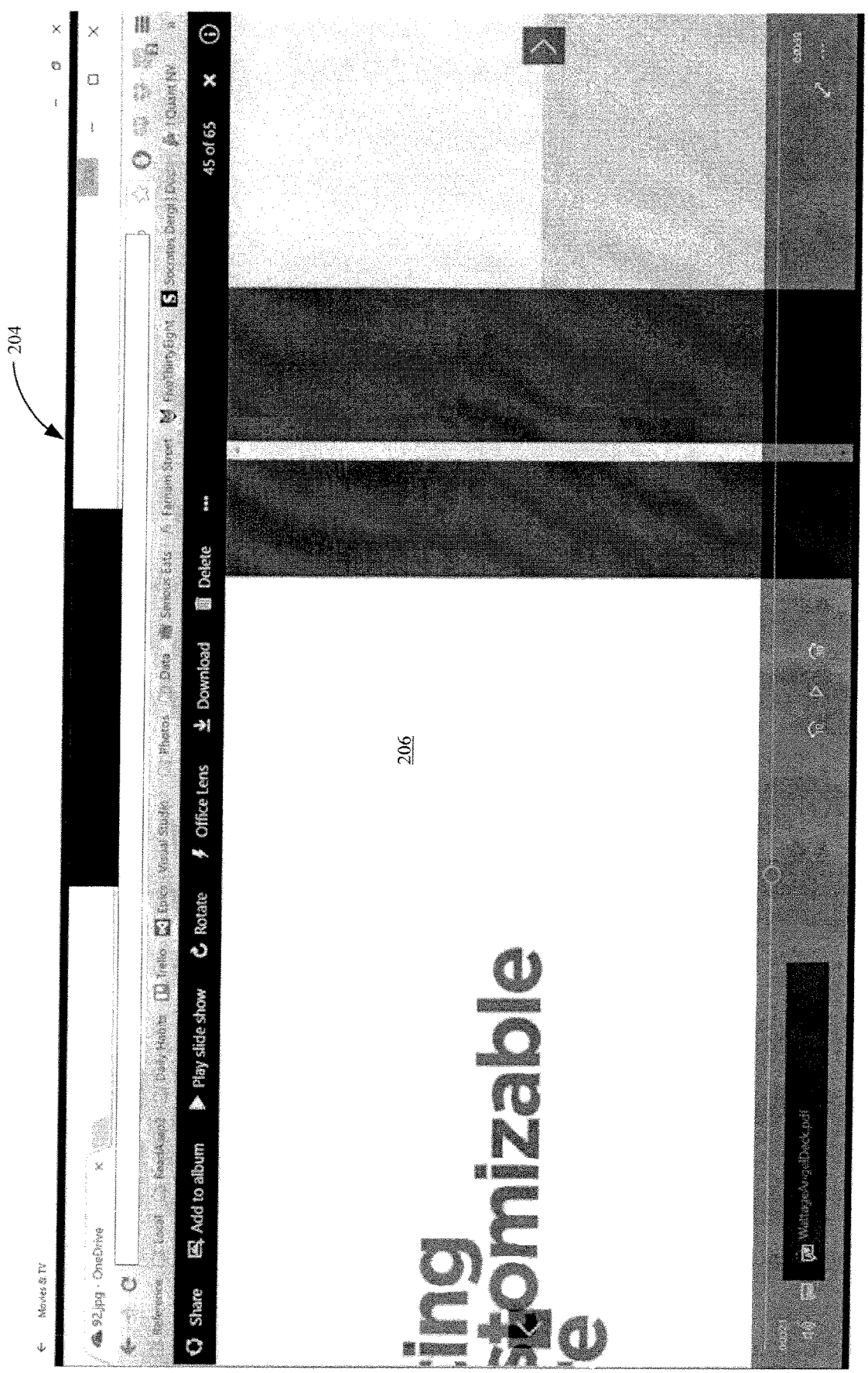

FIG. 6 shows another user interface display 204 where the user has scrolled to the left (from the user interface display 200 shown in FIG. 5) and a carousel representation 206 is now being partially displayed (part of the carousel representation 206 is off the screen to the left) that corresponds to one of the PDF files 198 (illustrated in FIG. 4). It can be seen that the carousel representation 206 of the PDF file allows the user to see a portion of the PDF file (e.g., the first page), in the same way that the user can see a photo as illustrated in FIG. 5, in carousel viewing mode.

Figure 7:
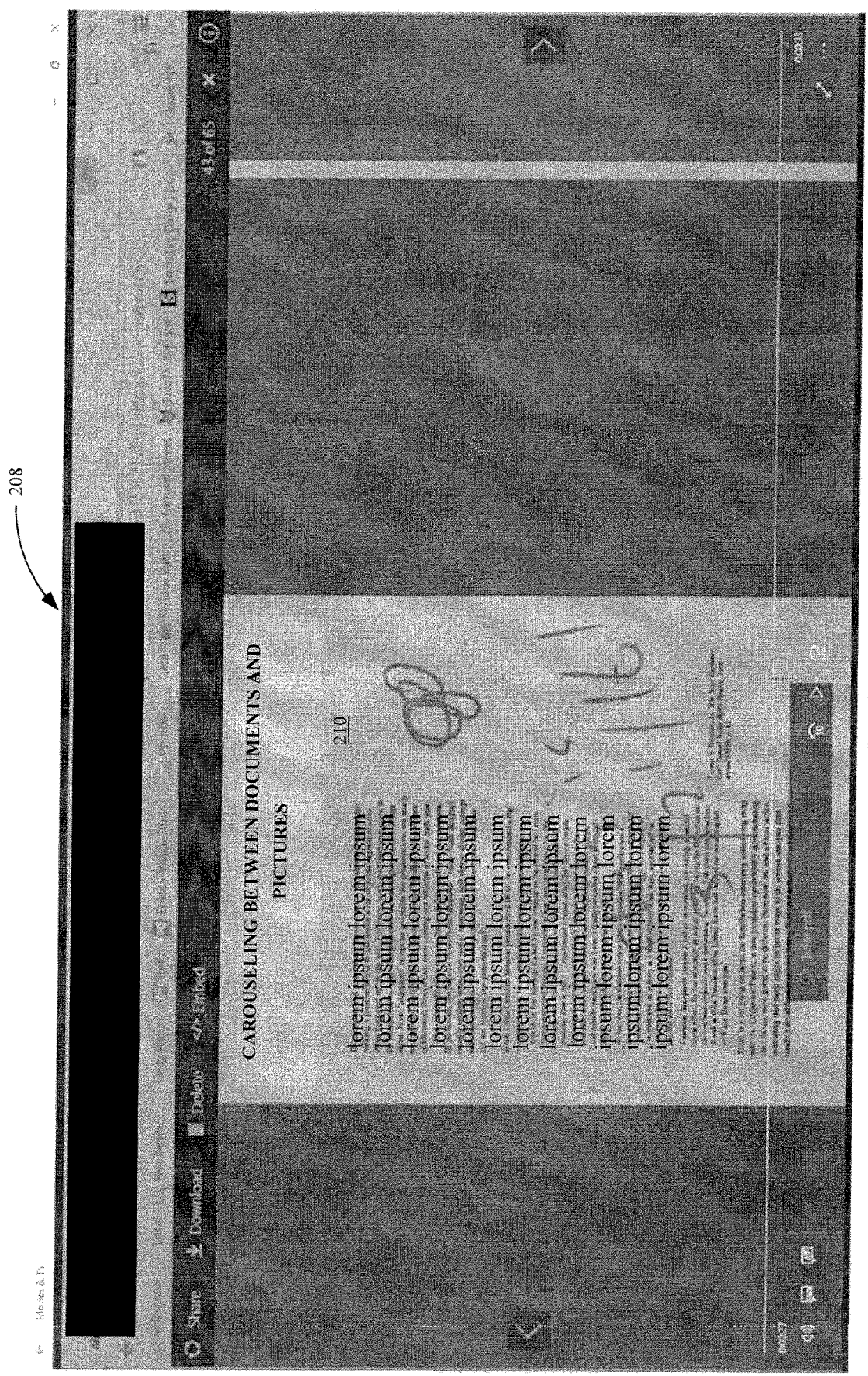

FIG. 7 shows another user interface display 208 in which the user has scanned further to the left from that shown in FIG. 6, so that another carousel representation 210 of a PDF file is displayed. At some point, interactive mode detection logic 154 illustratively displays a user input mechanism (such as user input mechanism 212 shown in FIG. 8) that can be actuated by the user in order to enter the interactive viewing mode. For instance, in one example, user input mechanism 212 can be generated for the user when the user hovers the mouse cursor over carousel representation 210 for a predetermined period of time. In another example, user input mechanism 212 can be surfaced for the user as soon as the user scrolls to carousel representation 210 (or any other carousel representation), and user input mechanism 212 can be removed from the display after a predetermined period of time. All of these and other methods of displaying the user input mechanism 212 are contemplated herein.

Figure 8:
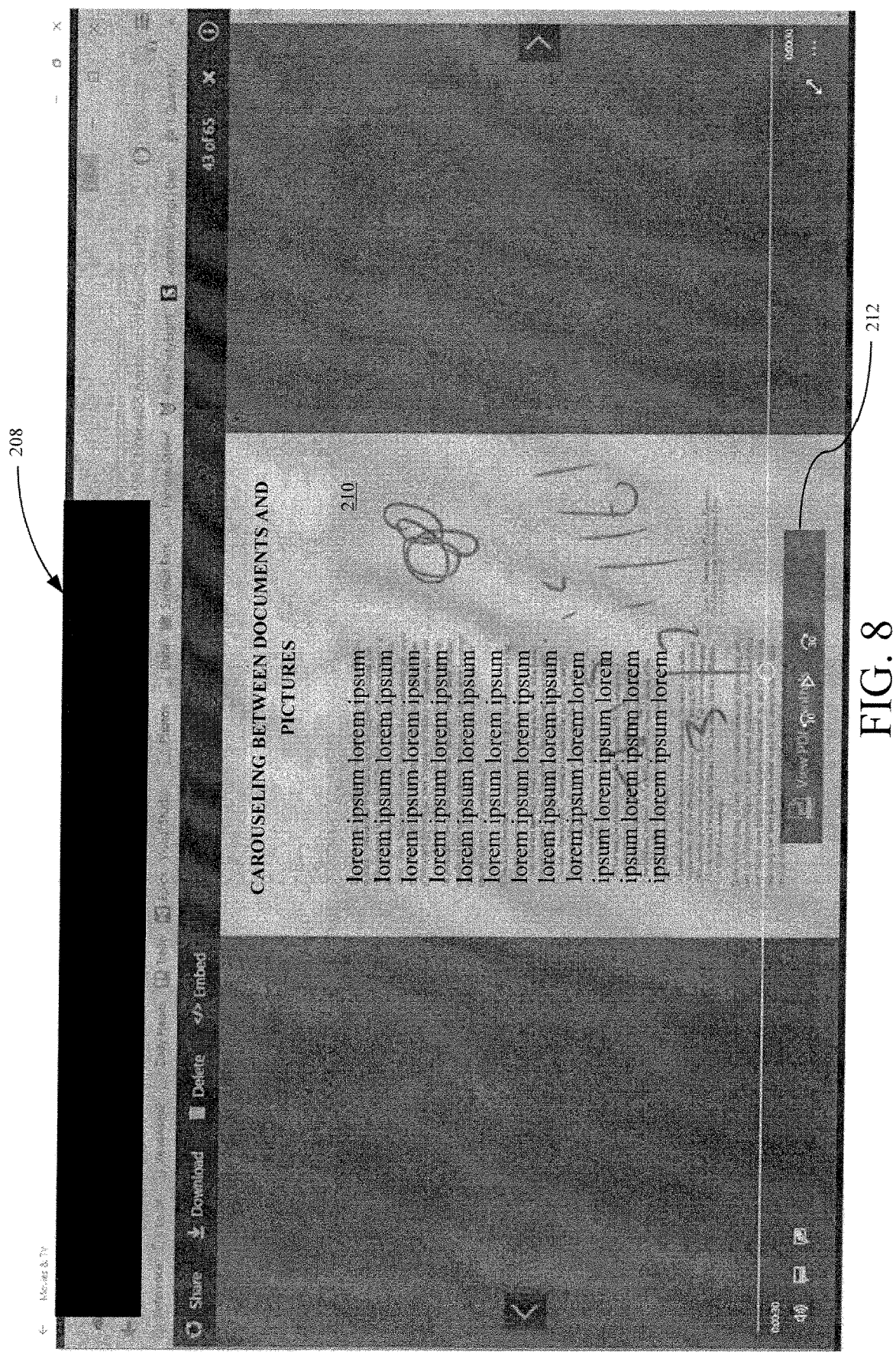
Figure 9:
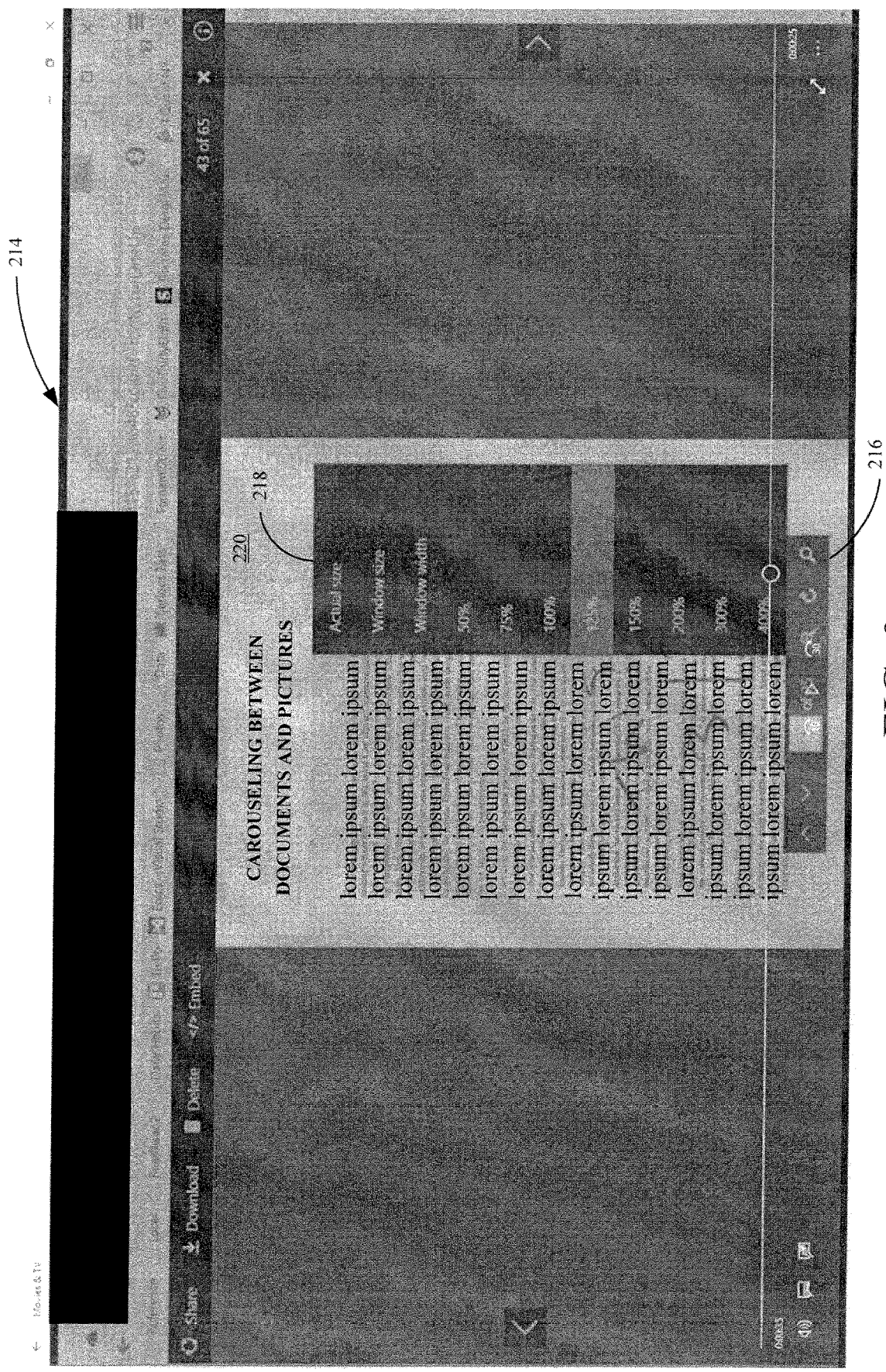

FIG. 9 shows user interface display 214, which is similar to that shown in FIG. 8, except the user has now actuated the user input mechanism 212 and entered the interactive mode. In response, functionality accessing logic 158 has accessed the interaction functionality corresponding to a PDF file, and has now surfaced user input mechanisms 216 that can be actuated by the user in order to take action on the PDF file being displayed. For instance, it can be seen that the user has actuated a zoom user input mechanism so that a pop-up display 218 is now displayed. The user can select a zooming size and that will be applied to the display 220 of the PDF file.

Figure 10:
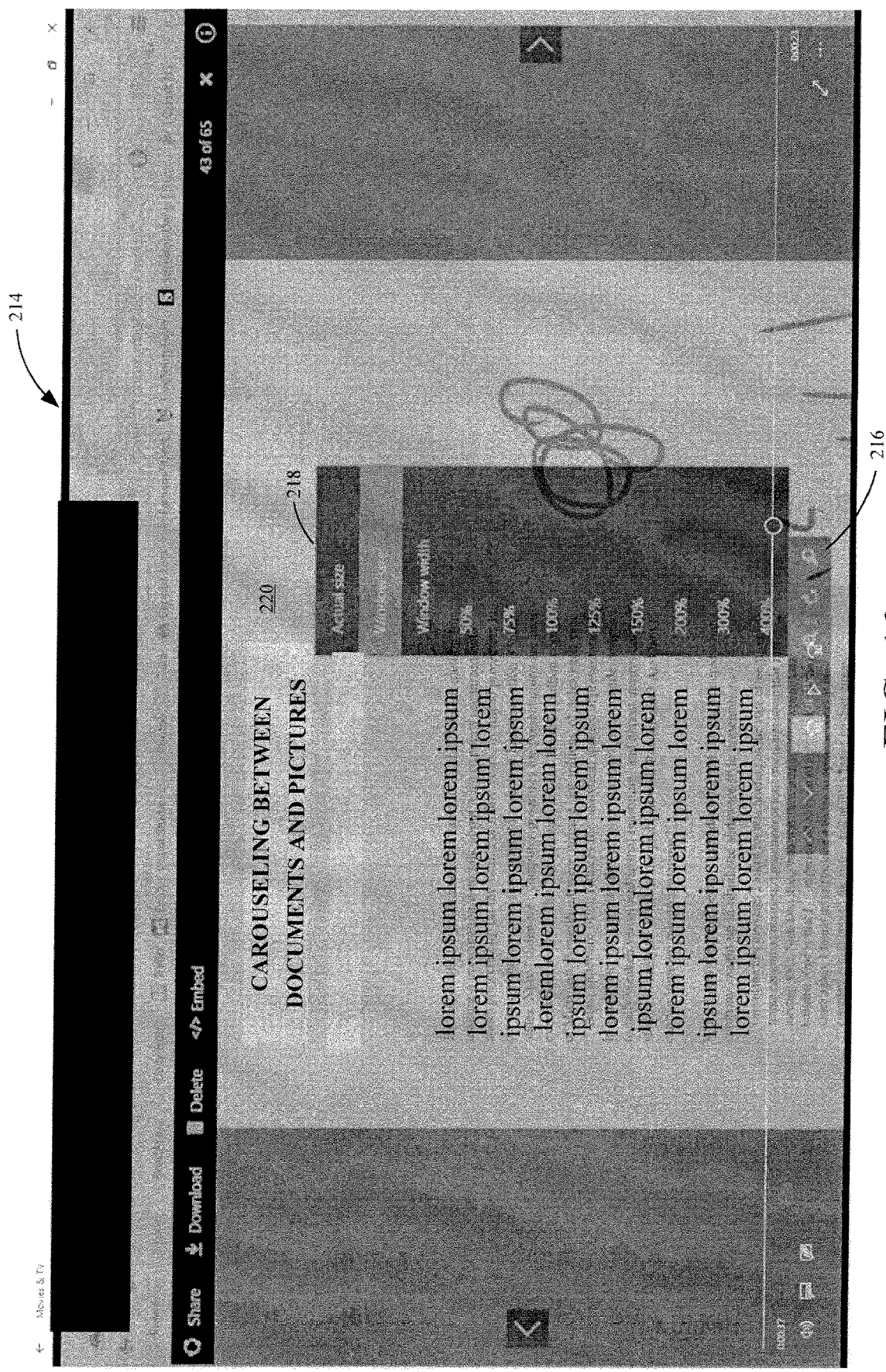

FIG. 10 is similar to FIG. 9, and similar items are similarly numbered. However, it can be seen that display 220 has now been resized based on user actuation of one of the user input mechanisms in pop-up display 218. Thus, the user has interacted with the PDF file.

Figure 11:
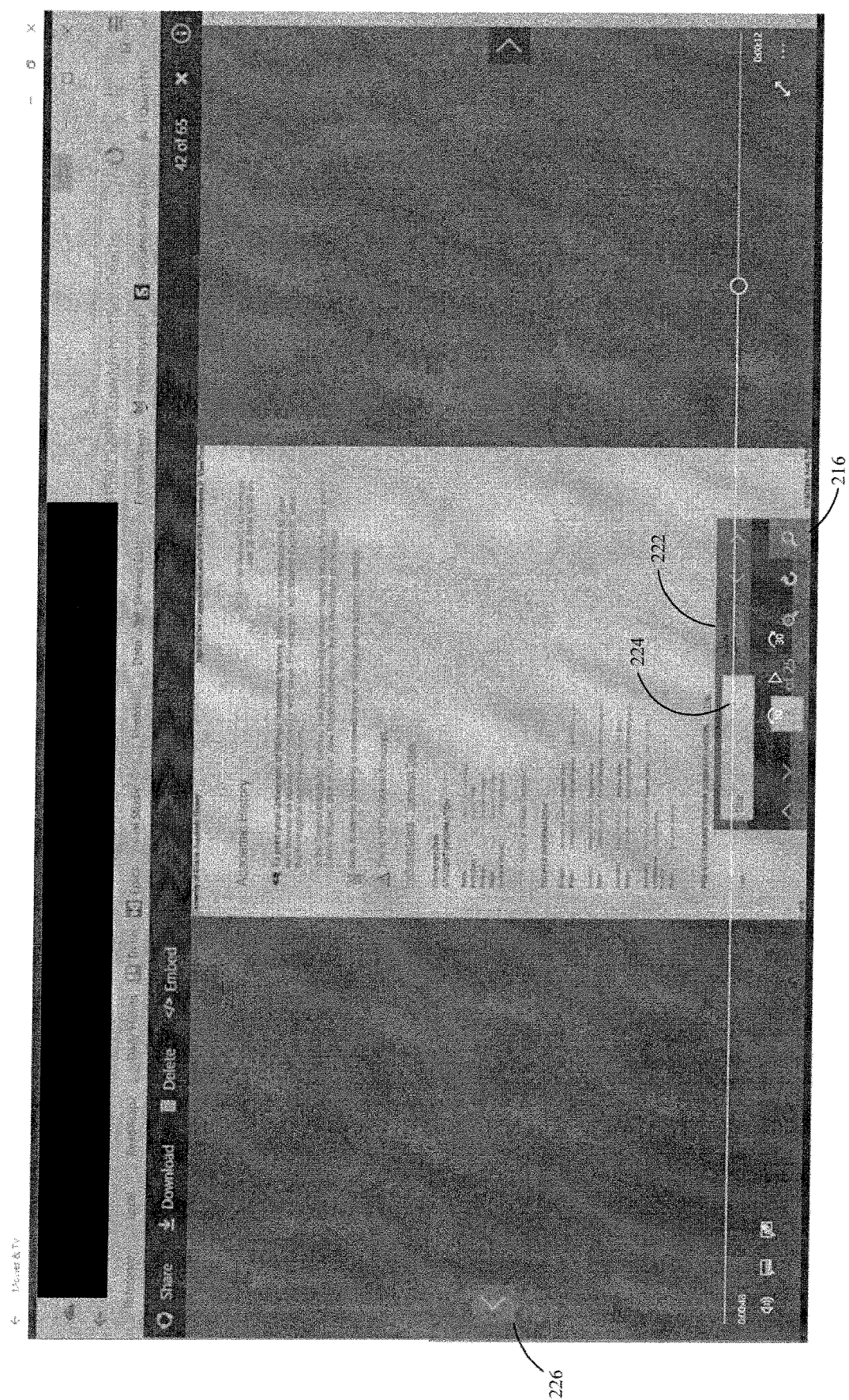

FIG. 11 shows that the user has now interacted with the PDF file by paging to a separate page within the PDF file being displayed using user input mechanisms 216. The user has also activated a search feature so that pop-up display 222 is generated. Display 222 includes a text box 224 where the user can enter text in order to search the PDF file being displayed for the text entered in text box 224.

FIG. 11 also shows that, at some point, the user will provide an input indicating that the user wishes to exit the interactive mode and reenter the carousel display mode. In the example shown in FIG. 11, the user can do this by actuating the left arrow user input mechanism 226, which is one of the user input mechanisms generated by carousel viewing logic 136. This indicates to carousel mode detection logic 150 that the user wishes to exit the interactive mode and reenter the carousel viewing mode. In that case, the carousel viewing logic 136 again generates (or accesses) carousel representations of the files and displays them in a horizontally scrollable carousel display.

Figure 12:
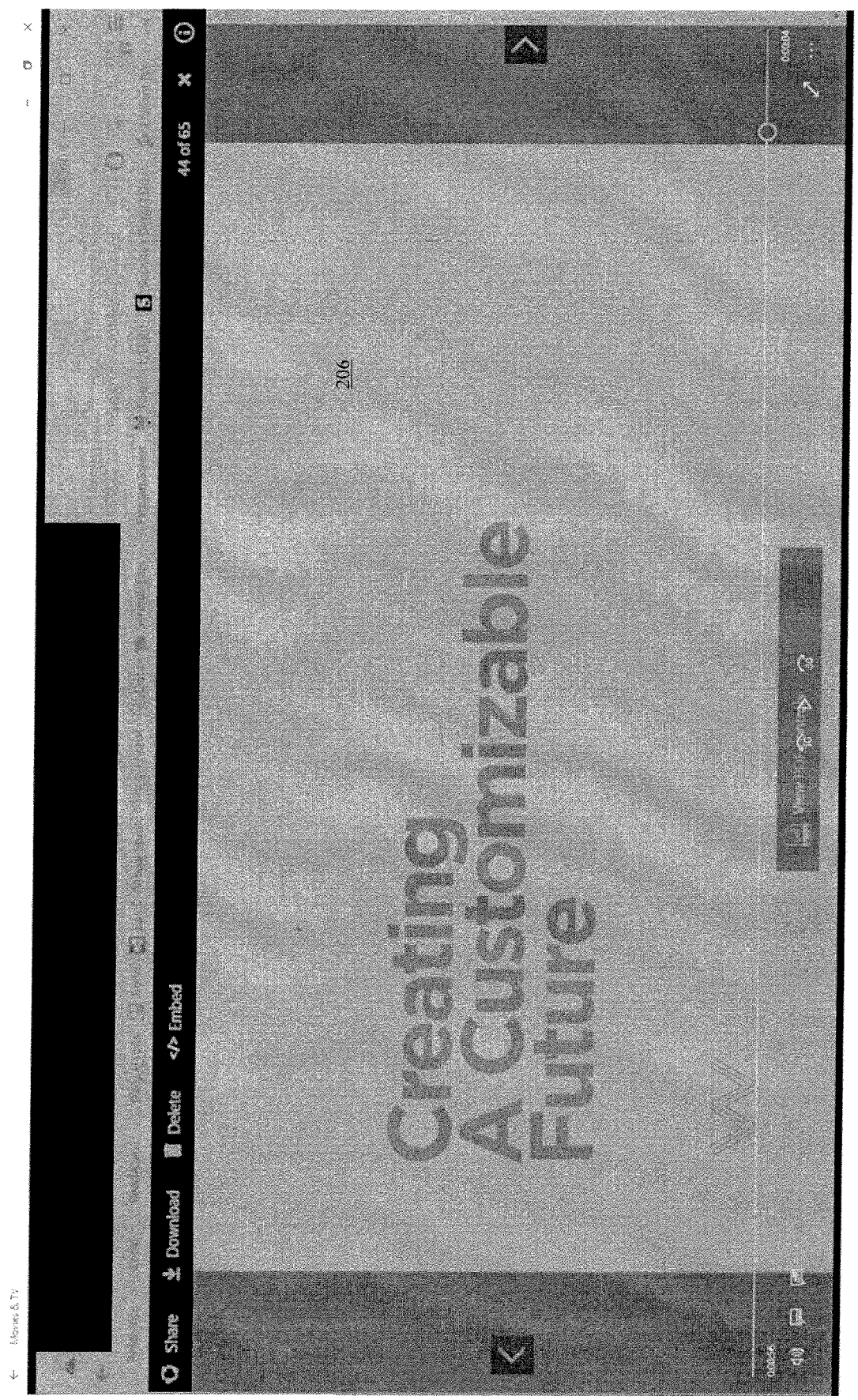

FIG. 12 shows that the user has now again controlled the system to enter the carousel viewing mode and scrolled to the right so that the carousel representation 206 is again displayed for another PDF file. Thus, the user is now again in the carousel viewing mode where the carousel representations can be horizontally scrolled based on user inputs.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 13:
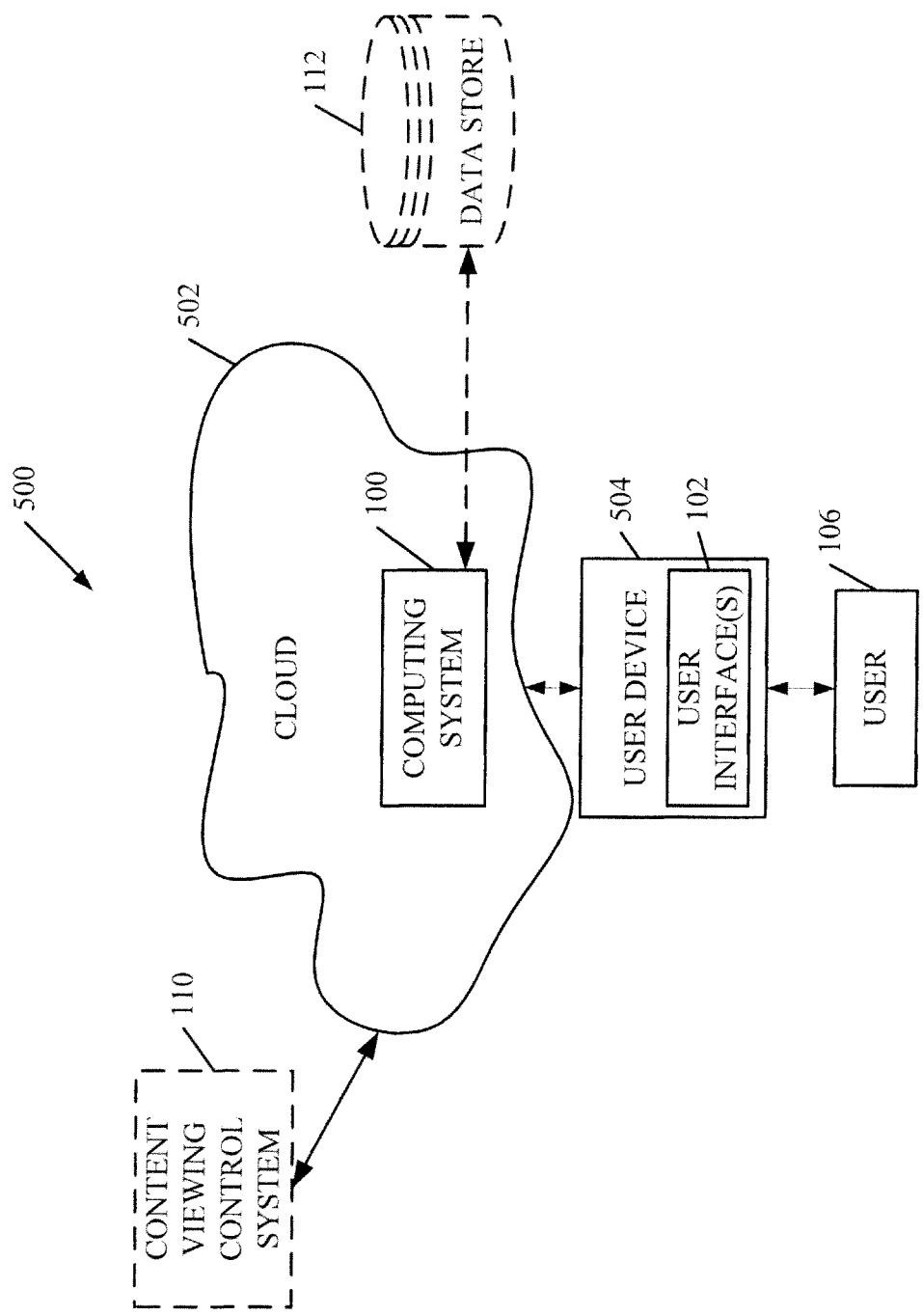
FIG. 13 shows one example of the computing system illustrated in FIG. 1, deployed in a cloud computing architecture.

FIG. 13 is a block diagram of computing system 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 13, some items are similar to those shown in FIG. 1 and they are similarly numbered. FIG. 13 specifically shows that computing system 100 can be located in cloud 502 (which can be public, private, or a combination where portions are public while others are private). Therefore, user 106 uses a user device 504 that to access those systems through cloud 502.

FIG. 13 also depicts another example of a cloud architecture. FIG. 13 shows that it is also contemplated that some elements of computing system 100 can be disposed in cloud 502 while others are not. By way of example, data store 112 can be disposed outside of cloud 502, and accessed through cloud 502. In another example, content viewing control system 110 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
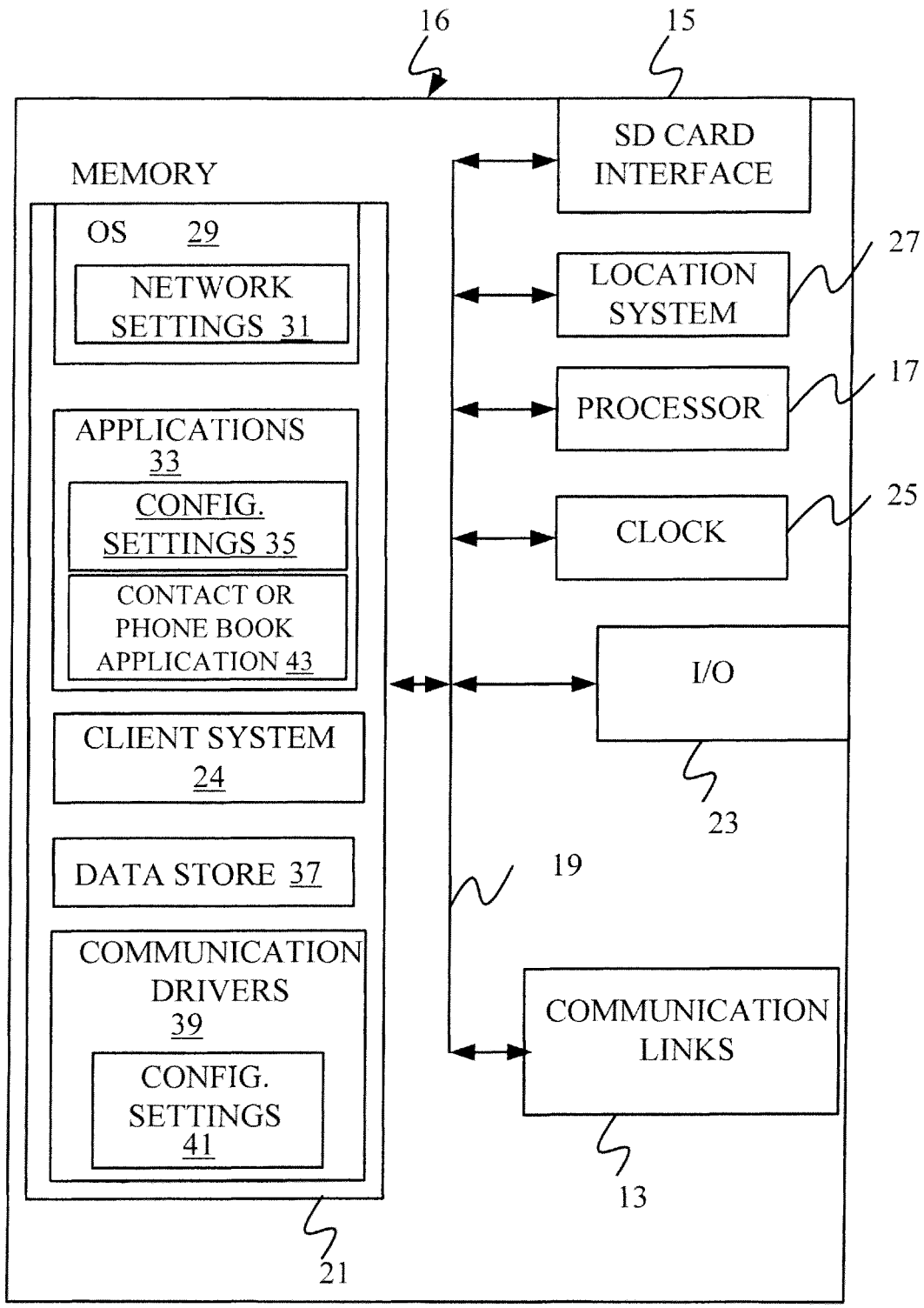
FIGS. 14-16 show various examples of mobile devices that can be used in the architectures in the previous figures.
Figure 15:
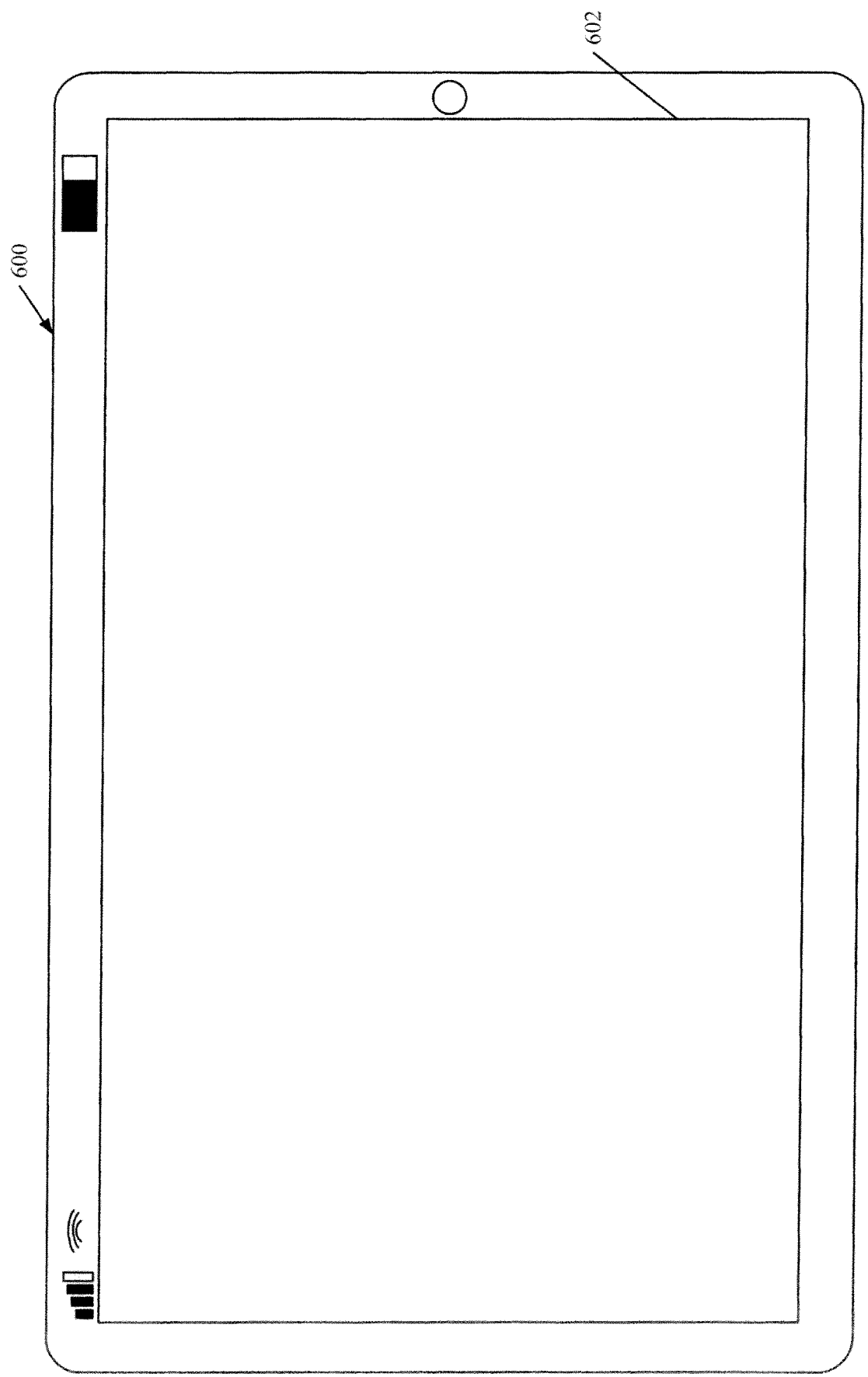
Figure 16:
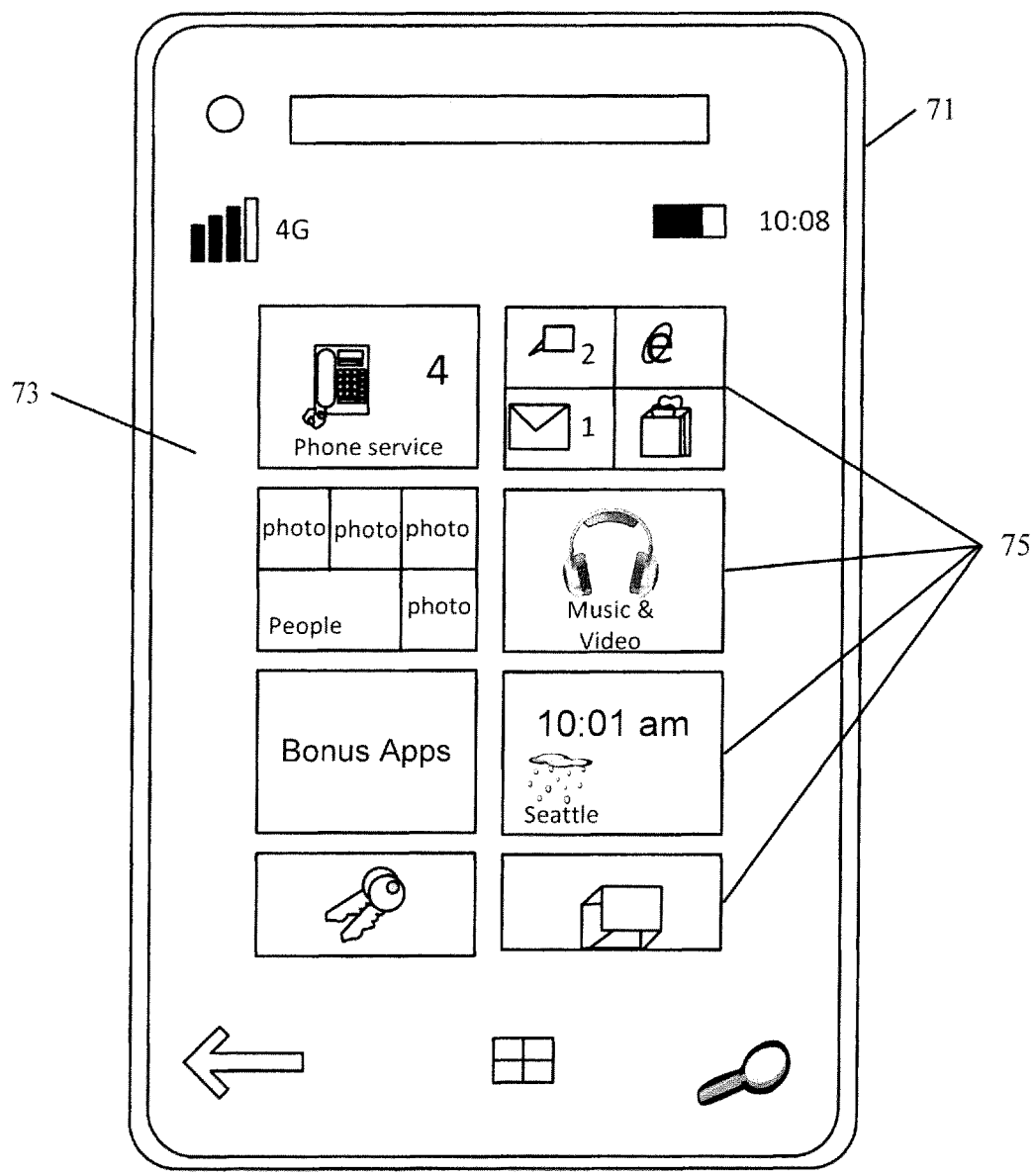

FIG. 14 is a simplified block diagram of one illustrative embodiment of a handheld or mobile computing device that can be used as a user's or client's hand held device 16, in which the present system (or parts of it) can be deployed. FIGS. 15-16 are examples of handheld or mobile devices.

FIG. 14 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 108 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 15 shows one example in which device 16 is a tablet computer 600. In FIG. 15, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 16 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
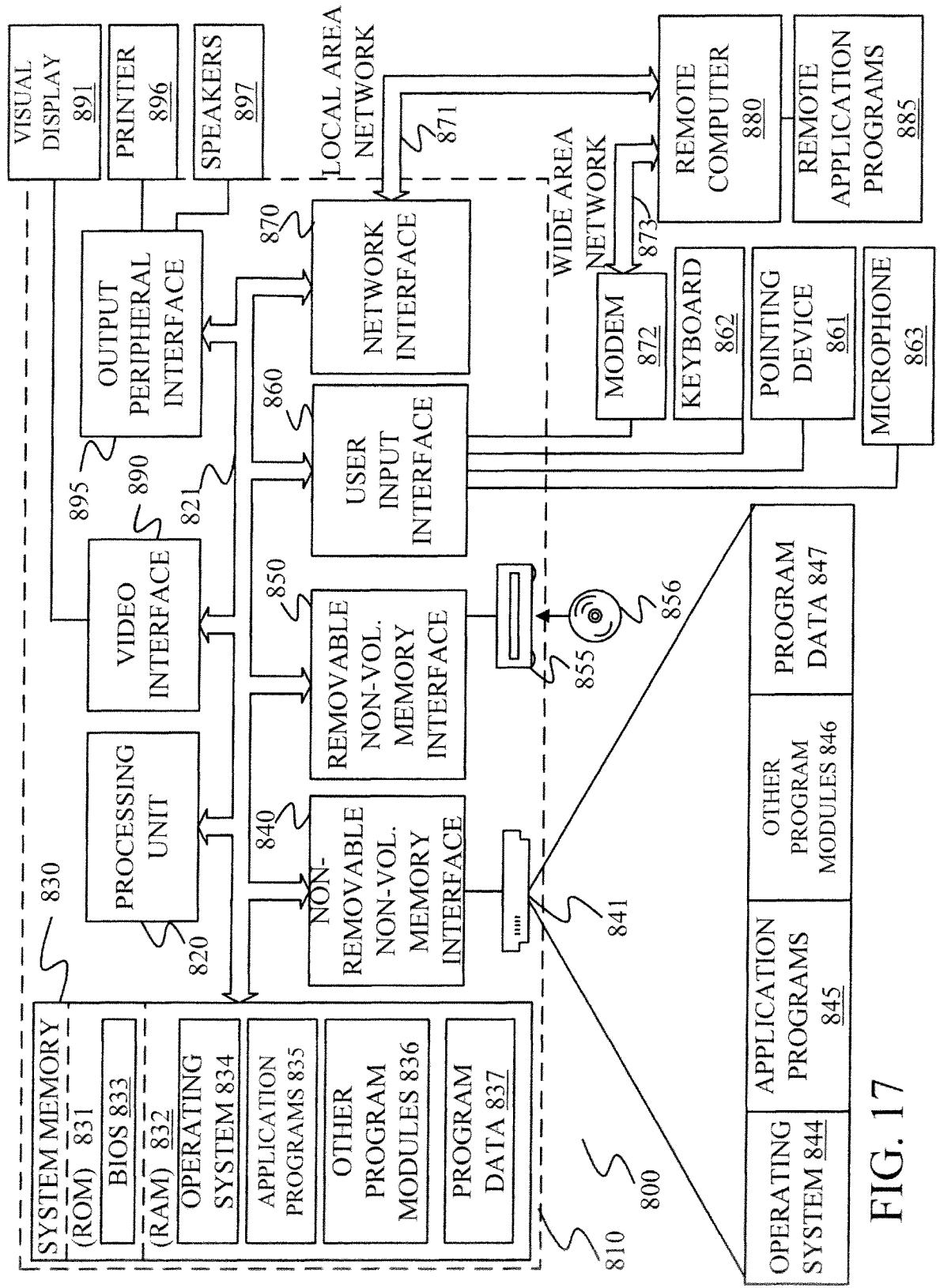
FIG. 17 is a block diagram of one example of a computing environment that can be used in the architectures shown in the previous figures.

FIG. 17 is one example of a computing environment in which system 100, or parts of it, (for example) can be deployed. With reference to FIG. 17, an example system for implementing some embodiments includes a general-purpose computing device in the form of a computer 810. Components of computer 810 may include, but are not limited to, a processing unit 820 (which can comprise processors or servers 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 17.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 17 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 17 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

carousel viewing logic that displays a plurality of different representations of files, of different media types, that are stored in a folder, in a carousel viewing mode;

interactive mode detection logic that detects a user interaction input corresponding to a given representation of a given file; and function accessing logic that detects a media type of the given file and surfaces, for user interaction, a user input mechanism for interacting with the given file based on the detected media type.

Example 2 is the computing system of any or all previous examples and further comprising:

event handling registration logic configured to handle user input events generated based on user actuation of the user input mechanism, in interacting with the given file.

Example 3 is the computing system of any or all previous examples wherein the function accessing logic is configured to generate a control signal to control the given file based on user actuation of the user input mechanism.

Example 4 is the computing system of any or all previous examples wherein the function accessing logic is configured to surface the user input mechanism by launching an application based on the media type and surfacing interactive controls from the application.

Example 5 is the computing system of any or all previous examples wherein the function accessing logic is configured to surface the user input mechanism by identifying natively supported interactive controls, based on the media type, and surfacing the natively supported interactive controls for user interaction.

Example 6 is the computing system of any or all previous examples wherein the media type of the given file comprises a portable document format (pdf) media type and wherein the carousel viewing logic generates a carousel representation of the given file.

Example 7 is the computing system of any or all previous examples wherein the carousel viewing logic is configured to display the plurality of different representations of files as preview display representations.

Example 8 is a computer implemented method comprising:

displaying a plurality of representations of a plurality of different files, having different media types, that are stored in a folder, in a carousel viewing mode;

detecting a user interaction input corresponding to a given representation of a given file;

detecting a media type of the given file; and displaying the given file in an interactive mode in which a user can take interactive action on the given file.

Example 9 is the computer implemented method of any or all previous examples wherein displaying the given file in an interactive mode comprises:

surfacing, for user interaction, a user input mechanism for interacting with the given file based on the detected media type.

Example 10 is the computer implemented method of any or all previous examples and further comprising:

receiving user input events generated based on user actuation of the user input mechanism, in interacting with the given file; and handling the received user input events to control the file.

Example 11 is the computer implemented method of any or all previous examples and further comprising:

generating a control signal to control the given file based on user actuation of the user input mechanism.

Example 12 is the computer implemented method of any or all previous examples wherein surfacing a user input mechanism comprises:

launching an application based on the media type; and surfacing interactive controls from the application.

Example 13 is the computer implemented method of any or all previous examples wherein surfacing a user input mechanism comprises:
identifying natively supported interactive controls, based on the media type; and
surfacing the natively supported interactive controls for user interaction.

Example 14 is the computer implemented method of any or all previous examples wherein the media type of the given file comprises a portable document format (pdf) media type and wherein displaying a plurality of different representations comprises:
generates a carousel representation corresponding to the given file with the pdf media type.

Example 15 the computer implemented method of any or all previous examples wherein displaying a plurality of different representations comprises:
displaying the plurality of different representations of files as preview display representations.

Example 16 is the computer implemented method of any or all previous examples and further comprising:
detecting an interaction exit user input;
exiting the interactive mode; and
returning to displaying the plurality of representations of the plurality of different files in the carousel viewing mode.

Example 17 is the computer implemented method of any or all previous examples and further comprising:
detecting a carousel exit user input; and
exiting the carousel viewing mode.

Example 18 is the computer implemented method of any or all previous examples wherein displaying the plurality of representations in a carousel viewing mode comprises:
displaying the plurality of representations in a horizontally scrollable, continuous display.

Example 19 is a computing system, comprising:
carousel viewing logic that displays a plurality of different representations of files, of different media types, that are stored in a folder, in a carousel viewing mode;
interactive mode detection logic that detects a user interaction input corresponding to a given representation of a given file; and
function accessing logic that detects a media type of the given file and surfaces, for user interaction, a user input mechanism for interacting with the given file based on the detected media type and generates a control signal to control the given file based on user actuation of the user input mechanism.

Example 20 is the computing system of any or all previous examples wherein the function accessing logic is configured to surface the user input mechanism by launching an application based on the media type and surfacing interactive controls from the application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, configure the computing system to:
receive a folder selection input that selects a file folder from a plurality of file folders in a data store associated with the computing system, the selected file folder storing a plurality of files of a plurality of different media types;
generate a file folder user interface display that displays the selected file folder and includes a carousel viewing mode activation mechanism corresponding to the selected file folder;
in response to user actuation of the carousel viewing mode activation mechanism, generate a carousel view specific to the selected file folder that displays a plurality of different preview display representations of the files in the selected file folder,
wherein, in the carousel view, the plurality of different preview display representations of the files are displayed in a display pane that is continuously pannable in a first direction from a preview display representation of a first file in the selected file folder to a preview display representation of a last file in the selected file folder, wherein subsequent panning in the first direction returns the display pane to the preview display representation of the first file in the selected file folder;
based on a detected user interaction input with the display pane, select a particular one of the preview display representations corresponding to a particular one of the files;
detect a media type of the particular file;
render, in the carousel view in association with the preview display of the particular file, one or more interactive user input controls, each interactive user input control being user-actuatable to perform an action relative to the particular file; and
display, in the carousel view, different interactive user input controls for different representation of the files, based on the media types of the files.

2. The computing system of claim 1, wherein the instructions configure the computing system to:
process a user input event that is generated based on user actuation of the one or more interactive user input controls.

3. The computing system of claim 1 wherein the instructions configure the computing system to:
generate a control signal to control the particular file based on user actuation of the one or more interactive user input control.

4. The computing system of claim 3 wherein the instructions configure the computing system to identify natively supported interactive controls, based on the media type, and surfacing the natively supported interactive controls for user interaction.

5. The computing system of claim 3 wherein the media type of the particular file comprises a portable document format (pdf) media type and wherein the instructions configure the computing system to generate a preview display representation of the particular file.

6. The computing system of claim 1, wherein the plurality of different media types includes a word processing document, a portable document format (PDF) file, and a photo.

7. The computing system of claim 1, wherein the instructions, when executed, configure the computing system to:
based on the selection of the particular file, enter an interactive mode corresponding to the particular file, the interactive mode including the one or more interactive user input control; and in response to detecting an interaction mode exit user input, exit the interactive mode and return to displaying the plurality of different preview display representations in the carousel view.

8. A computer implemented method comprising:
receiving a folder selection input that selects a file folder from a plurality of file folders, the selected file folder storing a plurality of files of a plurality of different media types;
generating a file folder user interface display that displays the selected file folder and includes a carousel viewing mode activation mechanism corresponding to the selected file folder;
in response to user actuation of the carousel viewing mode activation mechanism, generating a carousel view specific to the selected file folder that displays a plurality of preview display representations of the plurality of files in a display pane;
based on a user scroll input, controlling the display pane to scroll the carousel view in a direction from the preview display representation of a first one of the files to the preview display representation of a last one of the files, wherein subsequent scrolling of the carousel view in the direction returns the carousel view to the preview display representation of the first file;
based on a detected user interaction input with the carousel view in the display pane, selecting a particular one of the preview display representations corresponding to a particular one of the files and entering an interactive mode corresponding to the particular file;
detecting a media type of the particular file;
displaying, in the interactive mode, one or more interactive user input controls, each interactive user input control being user-actuatable to perform an action relative to the particular file; and
in response to detecting an interaction mode exit user input, exiting the interactive mode and returning to displaying the plurality of preview display representations in the carousel view.

9. The computer implemented method of claim 8 and further comprising displaying, in the display pane, different interactive user input controls for different ones of the files, based on the media types of the different files.

10. The computer implemented method of claim 8 and further comprising:
receiving a user input event generated based on user actuation of the one or more interactive user input controls; and
process the received user input event to control the particular file.

11. The computer implemented method of claim 8 and further comprising:
generating a control signal to control the particular file based on user actuation of the one or more interactive user input controls.

12. The computer implemented method of claim 8, wherein the plurality of different media types includes a word processing document, a portable document format (PDF) file, and a photo.

13. The computer implemented method of claim 11, and further comprising:

identifying a natively supported interactive control, based on the media type; and
surfacing the natively supported interactive control for user interaction.

14. The computer implemented method of claim 11 wherein the media type of the particular file comprises a portable document format (pdf) media type and wherein displaying a plurality of different representations comprises:
generates a carousel representation corresponding to the particular file with the pdf media type.

15. The computer implemented method of claim 11 and further comprising:
detecting a carousel exit user input; and
exiting the carousel view.

16. The computer implemented method of claim 8 wherein the carousel view displays the plurality of preview display representations in a horizontally scrollable, continuous display.

17. A computing system, comprising:
at least one processor; and
memory storing instructions executable by the at least one processor, wherein the instructions, when executed, provide:
user interface logic configured to:
receive a folder selection input that selects a file folder from a plurality of file folders in a data store associated with the computing system, the selected file folder storing a plurality of files of a plurality of different media types;
generate a file folder user interface display that displays the selected file folder and includes a carousel viewing mode activation mechanism corresponding to the selected file folder;
carousel viewing logic configured to:
display, in a carousel viewing mode in a display pane that is specific to the selected file folder, a plurality of different representations of files of different media types in response to user actuation of the carousel viewing mode activation mechanism;
interactive mode detection logic configured to:
detect a user interaction input corresponding to a given representation of a particular one of the files; and
activate an interactive mode corresponding to the particular file based on the user interaction input; and
function accessing logic configured to:
detect a media type of the particular file;
display, in the interactive mode, one or more interactive user input controls, each interactive user input control being user-actuatable to perform an action relative to the particular file; and
in response to detecting an interaction mode exit user input, exit the interactive mode and return to displaying the plurality of different representations of flies in the carousel viewing mode.

18. The computing system of claim 17 wherein the plurality of different media types includes a word processing document, a portable document format (PDF) file, and a photo.

* * * * *